United States Patent Office.

WILLIAM COOLEY, OF WATERBURY, VERMONT, AND DAVID H. BURRELL, OF LITTLE FALLS, NEW YORK, ASSIGNORS TO WHITMAN & BURRELL, OF LITTLE FALLS, NEW YORK.

ARTIFICIAL CREAM.

SPECIFICATION forming part of Letters Patent No. 264,516, dated September 19, 1882.

Application filed November 23, 1881. (No specimens.)

*To all whom it may concern:*

Be it known that we, WILLIAM COOLEY, of Waterbury, Washington county, Vermont, and DAVID H. BURRELL, of Little Falls, Herkimer county, New York, citizens of the United States, have invented certain new and useful Improvements in Artificial Cream, of which the following is a specification.

The object of our invention is to produce an artificial cream that may be used with economy as a substitute for natural cream in the manufacture of butter and cheese.

While skim-milk is of but little value cream usually commands a high price in places where butter is largely made. In seeking for a cheap and wholesome substitute for natural cream we have found, by experiment, that an excellent artificial cream may be economically produced by means of a mechanical admixture of skim-milk and animal or vegetable oil. Our invention therefore consists in the method of manufacturing an artificial cream composed of oil or oleaginous substances mechanically incorporated with milk, and in the article so produced, as hereinafter more fully set forth.

In carrying out our invention we take olive, lard, oleomargarine, or butter oils, or other animal or vegetable oils, of suitable quality, and with each pound of oil incorporate from two to three pounds of milk. In daily practice we prefer to take one part of oil and two parts of sweet skim-milk. The oil and milk are preferably heated in separate vessels to from 112° to 150° Fahrenheit. When the proper temperature has been attained a stream is drawn from each vessel to a suitable emulsion or disintegrating-machine in which the mechanical incorporation or admixture of the oil and milk is effected. The machine which we have successfully employed for this purpose is described in Letters Patent No. 238,091, granted to Wm. Cooley, February 22, 1881; but any other machine adapted to effect a thorough disintegration and admixture of the milk and oil, so as to cause them to blend with each other in the formation of an artificial cream may be used, if desired. The heated milk and oil should be introduced to the machine simultaneously in suitable proportions, and for this purpose the stream of milk drawn from its separate vessel is preferably of about twice the volume of oil drawn from its vessel.

By the mechanical admixture or mingling of the oil and milk every globule of oil is coated with the caseine contained in the milk, and as caseine is the heaviest constituent of the milk the specific gravity of the oil thus inclosed therein is practically increased, so that the emulsion or artificial cream thus produced may be put into a large mass of milk without liability of the oil separating and rising to the surface, as would ordinarily be the result from a simple mixture of oil and milk. The oil globules, each separately inclosed in its sack of caseine, thus remain thoroughly incorporated in the artificial cream, of which they form a part, so that the entire mass of milk to which such artificial cream is added may be treated with rennet, coagulated in the usual time without haste, and cheese made in the same manner as when made from milk by ordinary methods.

This artificial cream differs from all other emulsions on account of its contained oil being so finely and evenly divided and so uniformly distributed throughout the milk in such fine particles or infinitesimal atoms that when the compound or "cream" is put into a thin fluid even it will not separate or rise to the surface quickly, as would be the case with ordinary emulsions. It is obvious that if the atoms or particles of oleaginous material were larger, and not so evenly distributed, their buoyancy would be sufficient to cause them to separate and rise to the surface quickly. By reason of this minute subdivision of an oleaginous material, and its thorough blending with the caseine of the milk, which coats each globule of oil, we are therefore enabled to produce an artificial cream that can be treated and used in every respect the same as natural cream.

It will therefore be seen that the artificial cream can be readily manufactured at one factory and then taken to cheese-factories in other places, not too remote, where it may be added to milk and made into cheese without any separation of the oil.

We have also made butter from this artificial cream by making the cream one day, then setting it aside for twenty-four hours, or until it has become acid, the same as cream is ordinarily treated, and then churning the artificial cream for butter.

We have also taken the artificial cream and put it into a quantity of new milk, and then let the mixture "set" twenty-four to thirty-six hours, the real cream and the artificial cream coming to the surface of the milk together. We have then taken off all the cream thus produced and treated it exactly as if it had all been real or natural cream—that is, we have kept it twenty-four hours, until it became acid, and then churned it, obtaining real fine butter that was very difficult to detect from the finest creamery products.

We are aware that cheese has been made from skim-milk and oil mixed together; but not by first producing an artificial cream. Practical success has not attended the putting of oil directly into the entire mass of milk, and then trying to confine the oil by the action of something to coagulate the milk quickly, thereby attempting to catch the oil and hold it, so to speak, in the mass of milk. The results of such attempts show that much of the oil is released and cannot be worked into the cheese.

We do not claim the manufacture of cheese from an admixture of milk and fat with rennet added, as that is covered by the patent to H. O. Freeman, No. 136,051, dated February 18, 1873. Neither do we claim butter made instantly from an admixture of milk and oil, as described in the patents of H. Mege, No. 146,012, reissued September 24, 1878, No. 8,424, and G. Cosine, No. 173,591, dated February 15, 1876. Nor do we claim the addition of an oleaginous material—such as cream, melted butter, or lard—to a curd prepared from buttermilk, as described in the patent to Wm. Cooley, No. 241,788, dated May 24, 1881. We do believe, however, that we have invented an important and valuable substitute for cream as an article that can be used and treated as real cream; and, further, that by the use of such artificial cream a great deal finer quality of cheese can be made with skim-milk than has heretofore been obtained; and we also claim that by putting this artificial cream into new milk and allowing both the real cream and the artificial to rise to the surface together, setting from twelve to thirty-six hours, and then treating the entire amount of cream so obtained as is usual in making butter, we get a product made up from one-half to three-fourths oil and the balance real butter, which product it is difficult to distinguish from the finest butter made entirely from pure cream; and we can also produce a good, fair article of artificial butter much better than real butter that is so often strong and frowy by making an artificial cream of one part oil and two to three parts milk, treating this cream the same as real cream—that is, keeping it until it is slightly acid and then churning it in any of the ordinary churns employed to make real butter; or the artificial cream may be churned immediately, if desired.

It will be understood that we do not limit ourselves to making an artificial cream from fat or oil and skim-milk, as an excellent article may be made from new milk and animal or vegetable oil; and we have also made the artificial cream from butter-milk and oil; but in this case the product is apt to have the flavor of the buttermilk.

Having thus described our invention, what we claim as new, and desire to secure by Letters Patent, is—

1. As a new article of manufacture, an artificial cream composed of an oleaginous substance mechanically blended or otherwise incorporated with milk, butter-milk, or cream, the oleaginous material being in a state of minute and even division, and each particle incased in a coating of caseine, substantially as specified.

2. The herein-described method of preparing an artificial cream or emulsion formed from oleaginous material and milk, butter-milk, or cream, which consists in mechanically mingling the same in about the proportions specified, whereby the ingredients are reduced to a state of minute division, and each particle of oleaginous substance is inclosed in a coating of caseine, substantially as set forth.

In testimony whereof we affix our signatures in presence of two witnesses.

WILLIAM COOLEY.
DAVID H. BURRELL.

Witnesses:
MERRICK FREEMAN,
S. B. POMEROY.